United States Patent
Tseng et al.

(10) Patent No.: US 8,586,155 B2
(45) Date of Patent: Nov. 19, 2013

(54) DISPLAY DEVICE

(75) Inventors: Shih-Hao Tseng, Tainan (TW);
 Shih-Hsing Hung, Hsinchu County
 (TW); Chih-Jen Hu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 243 days.

(21) Appl. No.: 13/030,130

(22) Filed: Feb. 18, 2011

(65) Prior Publication Data

US 2012/0099072 A1 Apr. 26, 2012

(30) Foreign Application Priority Data

Oct. 25, 2010 (TW) .................................. 99136351 A

(51) Int. Cl.
 *G02F 1/1343* (2006.01)
(52) U.S. Cl.
 USPC ........................................... 428/1.5; 349/147
(58) Field of Classification Search
 USPC ............................ 428/14–1.5; 257/784–786;
 349/139–152; 216/17–19; 438/573
 See application file for complete search history.

(56) References Cited

U.S. PATENT DOCUMENTS

| | | | |
|---|---|---|---|
| 5,578,527 A | 11/1996 | Chang et al. | |
| 5,707,902 A | 1/1998 | Chang et al. | |
| 6,869,635 B2 | 3/2005 | Kobayashi | |
| 6,885,426 B2 | 4/2005 | Matsui et al. | |
| 7,427,832 B2 | 9/2008 | Kobayashi | |
| 7,898,170 B2 | 3/2011 | Kobayashi | |
| 2002/0033664 A1 | 3/2002 | Kobayashi | |
| 2003/0174273 A1* | 9/2003 | Matsui et al. | 349/151 |
| 2005/0062046 A1* | 3/2005 | Kim et al. | 257/72 |
| 2005/0134171 A1 | 6/2005 | Kobayashi | |
| 2007/0090541 A1* | 4/2007 | Tu | 257/786 |
| 2007/0194703 A1* | 8/2007 | Lin et al. | 313/506 |
| 2007/0297151 A1 | 12/2007 | Mosley et al. | |
| 2008/0017855 A1* | 1/2008 | Kim et al. | 257/48 |
| 2008/0180376 A1 | 7/2008 | Kim et al. | |
| 2008/0258617 A1 | 10/2008 | Kobayashi | |

(Continued)

FOREIGN PATENT DOCUMENTS

| | | |
|---|---|---|
| CN | 1363201 | 8/2002 |
| CN | 1444073 | 9/2003 |

(Continued)

OTHER PUBLICATIONS

"Office Action of Taiwan Counterpart Application", issued on Aug. 5, 2013, p. 1-p. 5, in which the listed references were cited.

*Primary Examiner* — Sophie Hon
(74) *Attorney, Agent, or Firm* — Jianq Chyun IP Office

(57) ABSTRACT

A display device includes a display panel and at least one driving chip. The display panel has a display region and a non-display region and includes a pixel array, a plurality of pads, a passivation layer, and a plurality of conductive patterns. The pixel array is located in the display region. The pads are located in the non-display region and electrically connected to the pixel array. The passivation layer is located on the pads and has a plurality of through holes. Each of the conductive patterns covers one of the pads and is electrically connected to the pad through at least one of the through holes. A material of the conductive patterns includes a polymer conductive material. The driving chip is located on the display panel and electrically connected to the pads of the display panel.

8 Claims, 3 Drawing Sheets

(56) References Cited

U.S. PATENT DOCUMENTS

| | | |
|---|---|---|
| 2009/0021189 A1 | 1/2009 | DuBose et al. |
| 2009/0140438 A1* | 6/2009 | Yamazaki et al. ............ 257/776 |
| 2009/0211819 A1* | 8/2009 | Wang et al. ................ 178/18.03 |
| 2009/0321123 A1 | 12/2009 | Lochtman et al. |

FOREIGN PATENT DOCUMENTS

| | | |
|---|---|---|
| CN | 1834736 | 9/2006 |
| CN | 101188219 | 5/2008 |
| CN | 101520704 | 9/2009 |
| EP | 1942365 A2 * | 7/2008 |
| TW | 200502655 | 1/2005 |
| TW | 200516678 | 5/2005 |
| TW | 200733802 | 9/2007 |
| TW | 1311826 | 7/2009 |
| TW | 200936734 | 9/2009 |

* cited by examiner

DISPLAY DEVICE

CROSS-REFERENCE TO RELATED APPLICATION

This application claims the priority benefit of Taiwan application serial no. 99136351, filed on Oct. 25, 2010. The entirety of the above-mentioned patent application is hereby incorporated by reference herein and made a part of this specification.

BACKGROUND OF THE INVENTION

1. Field of the Invention

The invention relates to a display device. More particularly, the invention relates to a display device in which a bonding region between a display panel and a driving chip is made of a polymer conductive material.

2. Description of Related Art

With the progress in the optoelectronic techniques and the semiconductor manufacturing techniques, flat display panel display characterized by high definition, optimal space utilization, low power consumption, and non-radiation have gradually become the mainstream products of the market. Among the existing display panels, the flexible display panel featuring compactness, great impact endurance, flexibility, wearability, and portability is one of the leading display panels at present.

In most cases, a display device is constituted by a pixel array substrate, an opposite substrate, and a display layer sandwiched between the two substrates. Pads and a transparent conductive layer located on the pads are configured in a non-display region of the pixel array substrate, such that the pixel array is electrically connected to the driving chip.

The flexible display panel has a flexible substrate rather than a rigid substrate. Hence, when the flexible substrate of the flexible display panel is bonded to the driving chip, the flexible substrate is deformed due to a downward pressure generated in the bonding process. The deformation of the substrate results in cracks in or damages to the transparent conductive layer located above the pads. As such, the overly high bonding impedance between the driving chip and the pads/the transparent conductive layer of the display panel leads to poor bonding.

In addition, if the transparent conductive layer located above the pads is cracked in the bonding process and thus exposes the underlying metal pads, the metal pads are likely to be oxidized or corroded. Thereby, the bonding impedance between the driving chip and the display panel is also increased, thus giving rise to poor bonding.

SUMMARY OF THE INVENTION

The invention is directed to a display device capable of preventing the transparent conductive layer located above the pads from being cracked or damaged when the flexible display panel is bonded to the driving chip, so as to avoid the poor bonding between the flexible display panel and the driving chip.

The invention provides a display device that includes a display panel and at least one driving chip. The display panel has a display region and a non-display region and includes a pixel array, a plurality of pads, a passivation layer, and a plurality of conductive patterns. The pixel array is located in the display region. The pads are located in the non-display region and electrically connected to the pixel array. The passivation layer is configured on the pads and has a plurality of through holes. Each of the conductive patterns covers one of the pads and is electrically connected to the pad through at least one of the through holes. A material of the conductive patterns includes a polymer conductive material. The driving chip is located on the display panel and electrically connected to the pads of the display panel.

Based on the above, each of the pads has one of the conductive patterns thereon, and a material of the conductive patterns includes a polymer conductive material. Since the polymer conductive material has favorable ductility, the conductive patterns located above the pads can be prevented from being cracked or damaged when the display panel and the driving chip are bonded. As such, the bonding yield between the driving chip and the display panel of the display device is improved.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
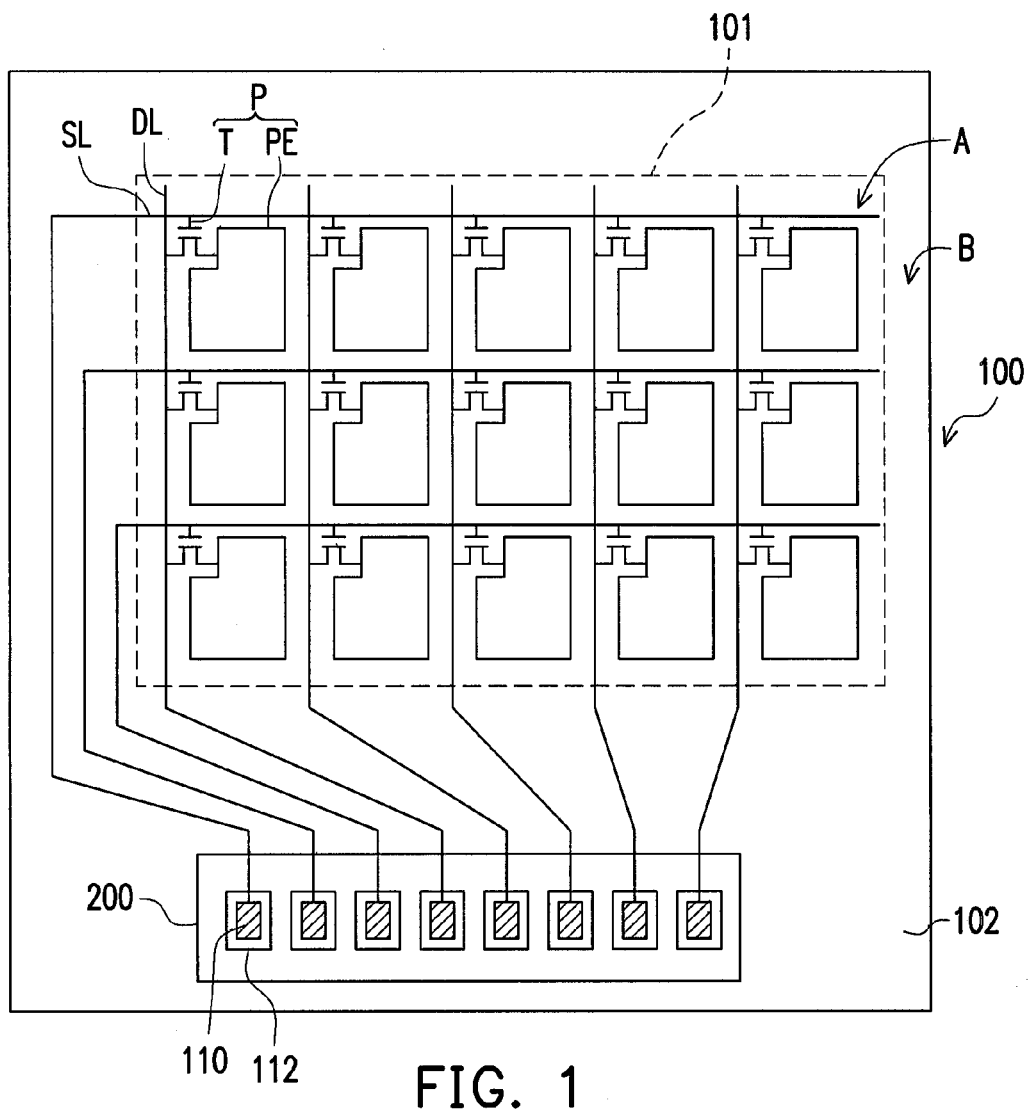
FIG. 1 is a schematic top view illustrating a display device according to an embodiment of the invention.
Figure 2:
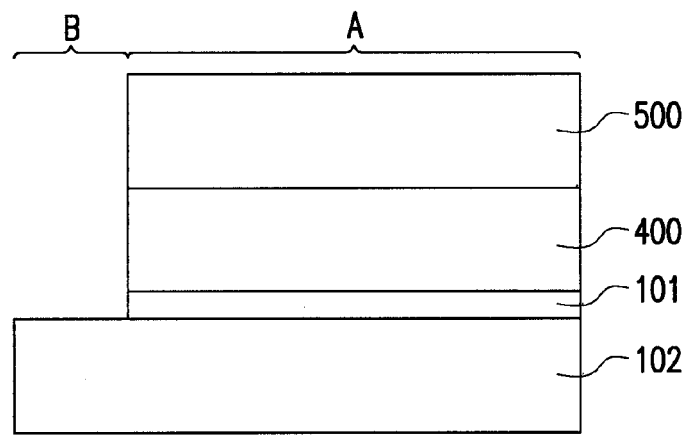
FIG. 2 is a schematic cross-sectional view illustrating a portion of the display device depicted in FIG. 1.
Figure 3:
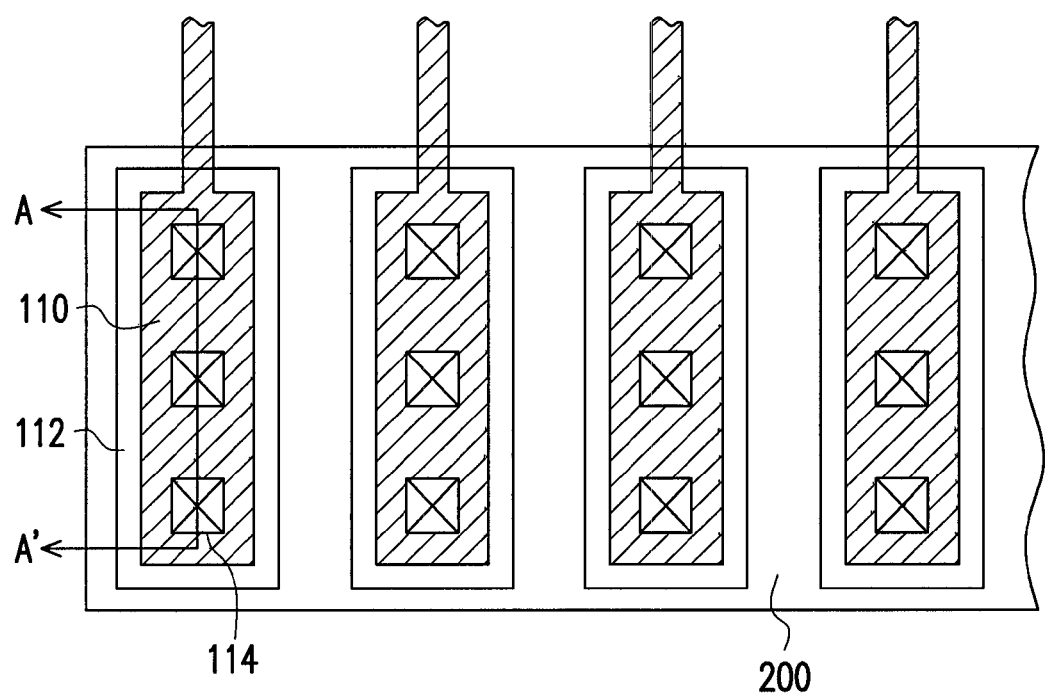
FIG. 3 is a schematic view illustrating that a driving chip and pads of the display device depicted in FIG. 1 are bonded.
Figure 4:
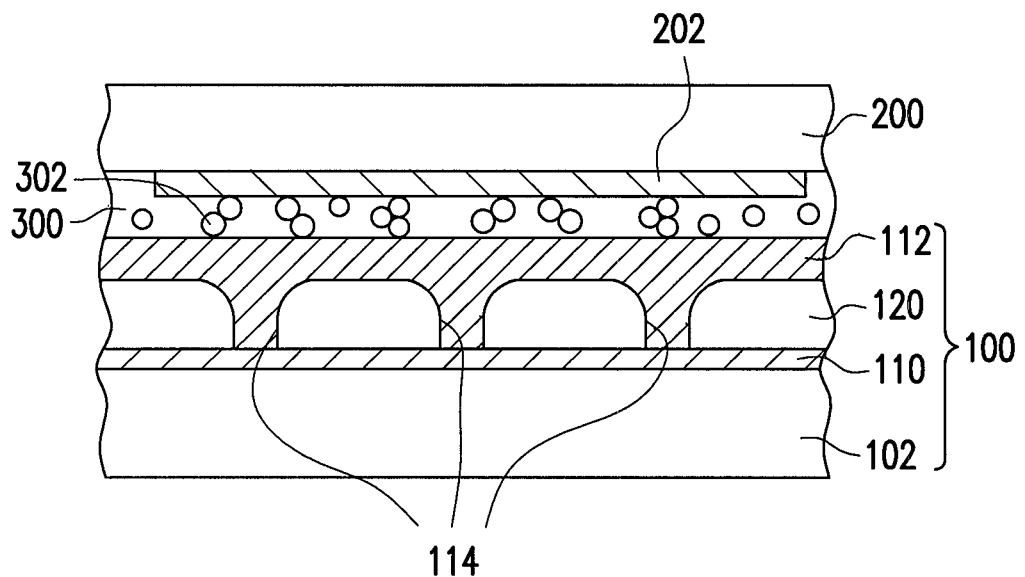
FIG. 4 is a schematic view taken along a sectional line A-A' depicted in FIG. 3.

FIG. 1 is a schematic top view illustrating a display device according to an embodiment of the invention. FIG. 2 is a schematic cross-sectional view illustrating a portion of the display device depicted in FIG. 1. FIG. 3 is a schematic view illustrating that a driving chip and pads of the display device depicted in FIG. 1 are bonded. FIG. 4 is a schematic view taken along a sectional line A-A' depicted in FIG. 3.

With reference to FIG. 1, the display device of this embodiment includes a display panel 100 and at least one driving chip 200.

The display panel 100 has a display region A and a non-display region B and includes a pixel array 101, a plurality of pads 110, and a plurality of conductive patterns 112. To be more specific, the display panel 100 includes a substrate 102, the pixel array 101, the pads 110, and the conductive patterns 112. The pixel array 101, the pads 110, and the conductive patterns 112 are located on the substrate 102. The substrate 102 can be a flexible substrate and made of organic polymer, metal, or other appropriate materials. The substrate 102 can certainly be a rigalsid substrate and made of glass, quartz, wafer, ceramics, or other appropriate materials.

In this embodiment, given the aforesaid display panel is a liquid crystal display (LCD) panel, an opposite substrate 500 and a liquid crystal layer 400 are further configured on the substrate 102, as shown in FIG. 2. If the aforesaid display panel is an organic electro-luminescent display panel, an organic light emitting layer and an opposite electrode layer (not shown) are further configured on the substrate 102. If the aforesaid display panel is an electrophoretic display panel, an opposite substrate and an electrophoretic display layer (not shown) are further configured on the substrate 102. That is to say, the type of the display panel is not limited in the invention.

In FIG. 1, the pixel array 101 is located in the display region A. The pixel array 101 includes a plurality of scan lines SL, a plurality of data lines DL, and a plurality of pixel structures P. The scan lines SL and the data lines DL are configured on the substrate 102 and extend from the display region A to the non-display region B. In this embodiment, the scan lines SL and the data lines DL are interlaced, and an insulating layer is sandwiched between the scan lines SL and the data lines DL. That is to say, extending directions of the data lines DL are not parallel to extending directions of the scan lines SL. Preferably, the extending directions of the data lines DL are perpendicular to the extending directions of the scan lines SL. Additionally, the scan lines SL and the data lines DL are in different layers. In consideration of electrical conductivity, the scan lines SL and the data lines DL are normally made of metallic materials. However, the invention is not limited thereto. According to other embodiments of the invention, the scan lines SL and the data lines DL can also be made of other conductive materials. The metallic material is, for example, an alloy, metal nitride, metal oxide, metal oxynitride, another appropriate material, or a layer in which the metallic material and any other conductive material are stacked to each other.

Each of the pixel structures P is electrically connected to the corresponding scan line SL and the corresponding data line DL. In this embodiment, each of the pixel structures P includes a switch device T and a pixel electrode PE. The switch devices T are electrically connected to the scan lines SL and the data lines DL, and the pixel electrodes PE are electrically connected to the switch devices T. The switch devices T can be bottom-gate thin film transistors or top-gate thin film transistors. The pixel electrodes PE can be transmissive pixel electrodes, reflective pixel electrodes, or transflective pixel electrodes.

Each of the scan lines SL extends from the display region A to the non-display region B and is then electrically connected to the corresponding one of the pads 110, and each of the data lines DL extends from the display region A to the non-display region B and is then electrically connected to the corresponding one of the pads 110. Namely, the pads 110 are located in the non-display region B, and the pads 110 are electrically connected to the pixel array 101.

At least one driving chip 200 is located on the display panel 100 and electrically connected to the pads 110 of the display panel 100. It should be mentioned that one driving chip 200 is exemplarily configured on the display panel 100 of this embodiment, while the number of the driving chips 200 is not limited in the invention. As a matter of fact, the number of the driving chips 200 is related to the dimension of the display panel 100. The at least one driving chip 200 can be at least one gate driving chip, at least one source driving chip, at least one integrated chip, or a combination thereof.

The bonding structure of the driving chip 200 and the pads 110 in the display panel 100 is elaborated hereinafter.

With reference to FIG. 3 and FIG. 4, the pads 110 on the substrate 102 are covered by a passivation layer 120. The passivation layer 120 can be made of an inorganic material (e.g., silicon oxide, silicon nitride, silicon oxynitride, other suitable materials, or a stacked layer having at least two of the above materials), an organic material, or a combination of the above. In addition, the passivation layer 120 has a plurality of through holes 114 that expose the pads 110 below the passivation layer 120. In this embodiment, each of the pads 110 has a plurality of through holes 114 configured thereon. However, the number and the shape of the through holes 114 on the pads 110 are not limited in the invention.

Additionally, each of the pads 110 further has one of the conductive patterns 112 thereon, and each of the conductive patterns 112 can be electrically connected to the corresponding one of the pads 110 through at least one of the through holes 114. A material of the conductive patterns 112 includes a polymer conductive material, e.g., organic polymer, copolymer, or conjugated polymer.

Specifically, the polymer conductive material can include polyaniline, polypyrrole, polythiophenes (polyethylenedioxythiophene), and poly(3 hexylthiophene), poly (p-phenylene vinylene), polyacetylene, poly(fluorene) polynaphthalene and poly(p-phenylenesulfide), 3,4-polyethylenedioxythiophene, or 3,4-polyethylenedioxythiophene:polystyrenesulfonate (PEDOT:PSS).

In this embodiment of the invention, an adhesive layer 300 is further configured between the display panel 100 and the driving chip 200, and thereby the driving chip 200 is adhered to the display panel 100. In the embodiment depicted in FIG. 4, the adhesive layer 300 is an anisotropic conductive film (ACF), for instance, and thus the adhesive layer 300 includes conductive particles 302. A contact structure 202 of the driving chip 300 is electrically connected to the conductive patterns 112 of the display panel 100 through the conductive particles 302. Namely, the driving chip 200 is electrically connected to the pads 110 of the display panel 100 through the conductive particles 302, the conductive patterns 112, and contact windows 114.

In other embodiments of the invention, the adhesive layer 300 can also be an anisotropic conductive paste, an anisotropic conductive adhesive, a non-conductive film (NCF) or a non-conductive adhesive (NCA). That is to say, the adhesive layer 300 simply serves to adhere the driving chip 200 to the display panel 100. The contact structure 202 of the driving chip 200 is electrically connected to the conductive patterns 112 directly, which is not shown in the drawings.

It should be mentioned that a method of bonding the driving chip 200 to the display panel 100 normally includes steps of placing the adhesive layer 300 on the display panel 100 and placing the driving chip 200 on the adhesive layer 300. A thermo-compression process is performed to press the driving chip 200 onto the display panel 100.

As described above, in the embodiments of the invention, each of the pads 110 has one of the conductive patterns 112 thereon, and the conductive patterns 112 are made of the polymer conductive material. The polymer conductive material has favorable ductility. Therefore, even though the substrate 102 of the display panel 100 is the flexible substrate and is thus deformed during the thermo-compression process, the ductility of the conductive patterns 112 allows the conductive patterns 112 to cushion the stress, such that the conductive patterns 112 are not cracked or damaged. The conductive patterns 112 can thus remain intact, and the bonding impedance between the driving chip 200 and the display panel 100 is not excessive.

Since, the conductive patterns 112 are not cracked or damaged during the thermo-compression process, the pads 110 (normally referred to as metal pads) located below the conductive patterns 112 are not exposed by the conductive patterns 112. Accordingly, the pads 110 are not exposed to the air and are not prevented from being oxidized or corroded.

In the previous embodiments, each of the conductive patterns 112 located above one of the pads 110 has the structure of the single-layered polymer conductive material. However, the invention is not limited thereto. The conductive patterns in other embodiments can have the multi-layered structure as discussed below.

Figure 5:
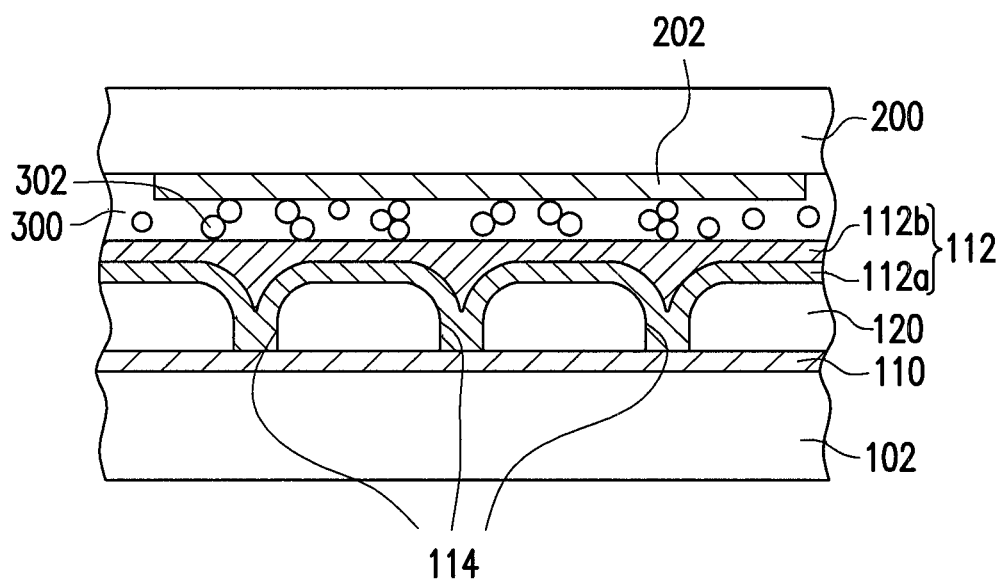
FIG. 5 is a schematic cross-sectional view illustrating a bonding region between a driving chip and pads of a display device according to another embodiment of the invention.

FIG. 5 is a schematic cross-sectional view illustrating a bonding area between a driving chip and pads of a display device according to another embodiment of the invention. The embodiment shown in FIG. 5 is similar to the embodiment shown in FIG. 4, and therefore identical components in FIG. 5 and FIG. 4 are denoted by the same numerals and are not further described hereinafter. The difference between the embodiment shown in FIG. 5 and the embodiment shown in FIG. 4 rests in that each of the conductive patterns 112 respectively located above one of the pads 110 includes a bottom conductive layer 112a and a top polymer conductive material layer 112b. In other words, each of the conductive patterns 112 includes several conductive layers, and the bottom conductive layer 112a and the top polymer conductive material layer 112b have the same pattern.

According to an embodiment of the invention, a material of the bottom conductive layer 112a of each of the conductive patterns 112 includes a transparent conductive material, e.g., indium tin oxide, indium zinc oxide, aluminum tin oxide, aluminum zinc oxide, indium germanium zinc oxide, or a stacked layer having at least two of the above materials. Besides, a material of the top polymer conductive material layer 112b of each of the conductive patterns 112 includes organic polymer, copolymer, or conjugated polymer. For instance, the top polymer conductive material layer 112b can be made of polyaniline, polypyrrole, polythiophenes (polyethylenedioxythiophene), and poly(3 hexylthiophene), poly (p-phenylene vinylene), polyacetylene, poly(fluorene) polynaphthalene and poly(p-phenylenesulfide), 3,4-polyethylenedioxythiophene, or 3,4-polyethylenedioxythiophene: polystyrenesulfonate (PEDOT:PSS).

In another embodiment of the invention, the material of the bottom conductive layer 112a of each of the conductive patterns 112 includes a metallic material, e.g., silver, gold, copper, aluminum, molybdenum, an alloy thereof, or a stacked layer having at least two of the above metallic materials. The material of the top polymer conductive material layer 112b of each of the conductive patterns 112 can include organic polymer, copolymer, or conjugated polymer. For instance, the top polymer conductive material layer 112b can be made of polyaniline, polypyrrole, polythiophenes (polyethylenedioxythiophene), and poly(3 hexylthiophene), poly (p-phenylene vinylene), polyacetylene, poly(fluorene) polynaphthalene and poly(p-phenylenesulfide), 3,4-polyethylenedioxythiophene, or 3,4-polyethylenedioxythiophene:polystyrenesulfonate (PEDOT:PSS).

In the embodiment depicted in FIG. 5, no matter whether the bottom conductive layer 112a of each of the conductive patterns 112 is made of the transparent conductive material or the metallic material, the bottom conductive layer 112a is covered by the top polymer conductive material layer 112b. The top polymer conductive material layer 112b has favorable ductility. Therefore, even though the substrate 102 of the display panel 100 is the flexible substrate and is thus deformed during the thermo-compression process implemented on the driving chip 200 and the display panel 100, the top polymer conductive material layer 112b with favorable ductility can cushion the stress, such that the conductive patterns 112 are not cracked or damaged. The conductive patterns 112 can thus remain intact, and the bonding impedance between the driving chip 200 and the display panel 100 is not excessive.

Likewise, since the conductive patterns 112 are not cracked or damaged during the thermo-compression process, the pads 110 located below the conductive patterns 112 are not exposed by the conductive patterns 112. Accordingly, the pads 110 are not exposed to the air and will not be oxidized or corroded.

In light of the foregoing, according to the invention, each of the pads has one of the conductive patterns thereon, and the conductive patterns can have the structure of the single-layered polymer conductive material or can be constituted by the bottom conductive layer and the top polymer conductive material layer. The polymer conductive material has favorable ductility, and thus the conductive patterns can be prevented from being cracked or damaged when the display panel and the driving chip are bonded. As such, the bonding yield between the driving chip and the display panel of the display is improved. Besides, since the conductive patterns can be prevented from being cracked or damaged when the display panel and the driving chip are bonded, the pads located below the conductive patterns are not exposed to the air and will not be oxidized or corroded.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display device comprising:
   a display panel having a display region and a non-display region, the display panel comprising:
      a pixel array located in the display region;
      a plurality of pads located in the non-display region and electrically connected to the pixel array;
      a passivation layer configured on the pads and having a plurality of through holes;
   a plurality of conductive patterns, each of the conductive patterns covering one of the pads and being electrically connected to the one of the pads through at least one of the through holes, a material of the conductive patterns comprising a polymer conductive material, wherein each of the conductive patterns comprises a top polymer conductive material layer and a bottom conductive layer of different material between the top polymer conductive material layer and the pads, such that the bottom conductive layer fills into the through holes to contact the pads and the top polymer conductive material layer covers the bottom conductive layer;
   at least one driving chip located on the display panel and electrically connected to the pads of the display panel;
   and an adhesive layer located between the display panel and the at least one driving chip, wherein the adhesive layer is located on the top polymer conductive material layer so as to contact with the top polymer conductive material layer.

2. The display device as claimed in claim 1, wherein the polymer conductive material comprises organic polymer, copolymer, or conjugated polymer.

3. The display device as claimed in claim 2, wherein the polymer conductive material comprises polyaniline, polypyrrole, polythiophenes (polyethylenedioxythiophene), and poly(3 hexylthiophene), poly (p-phenylene vinylene), polyacetylene, poly(fluorene) polynaphthalene and poly(p-phenylenesulfide), 3,4-polyethylenedioxythiophene, or 3,4-polyethylenedioxythiophene: polystyrenesulfonate.

4. The display device as claimed in claim 1, wherein the bottom conductive layer comprises a transparent conductive material.

5. The display device as claimed in claim 4, wherein the transparent conductive material comprises one of indium tin oxide, indium zinc oxide, aluminum tin oxide, aluminum zinc oxide and indium germanium zinc oxide, or a stacked layer having at least two of the above materials.

6. The display device as claimed in claim 1, wherein a material of the bottom conductive layer comprises a metallic material.

7. The display device as claimed in claim 6, wherein the metallic material comprises one of silver, gold, copper, aluminum and molybdenum, or an alloy having at least one of the above materials, or a stacked layer having at least two of the above metallic materials.

8. The display device as claimed in claim 1, wherein the adhesive layer comprises an anisotropic conductive film, an anisotropic conductive paste, an anisotropic conductive adhesive, a non-conductive film, or a non-conductive adhesive.

* * * * *